United States Patent Office 2,721,820
Patented Oct. 25, 1955

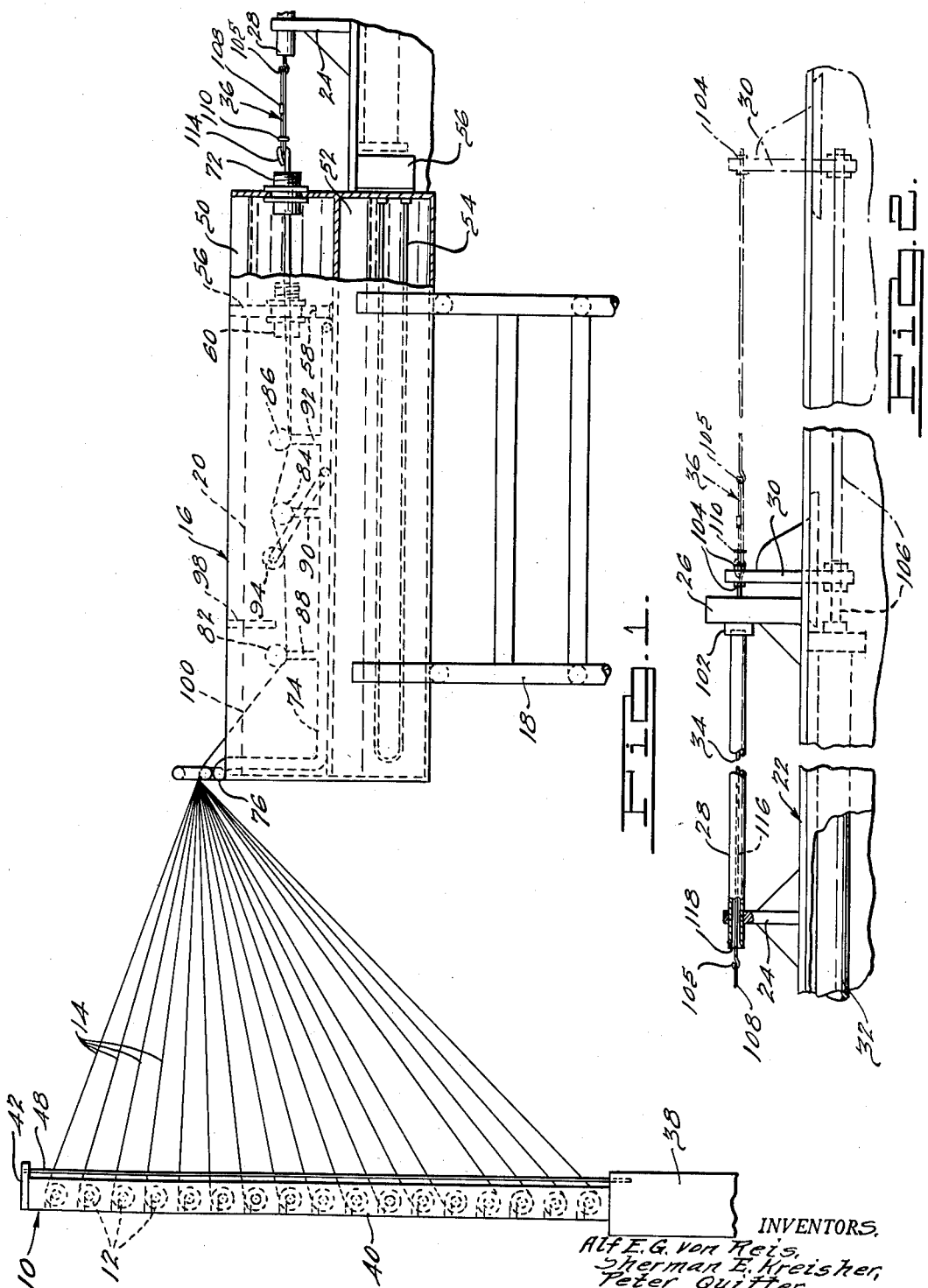

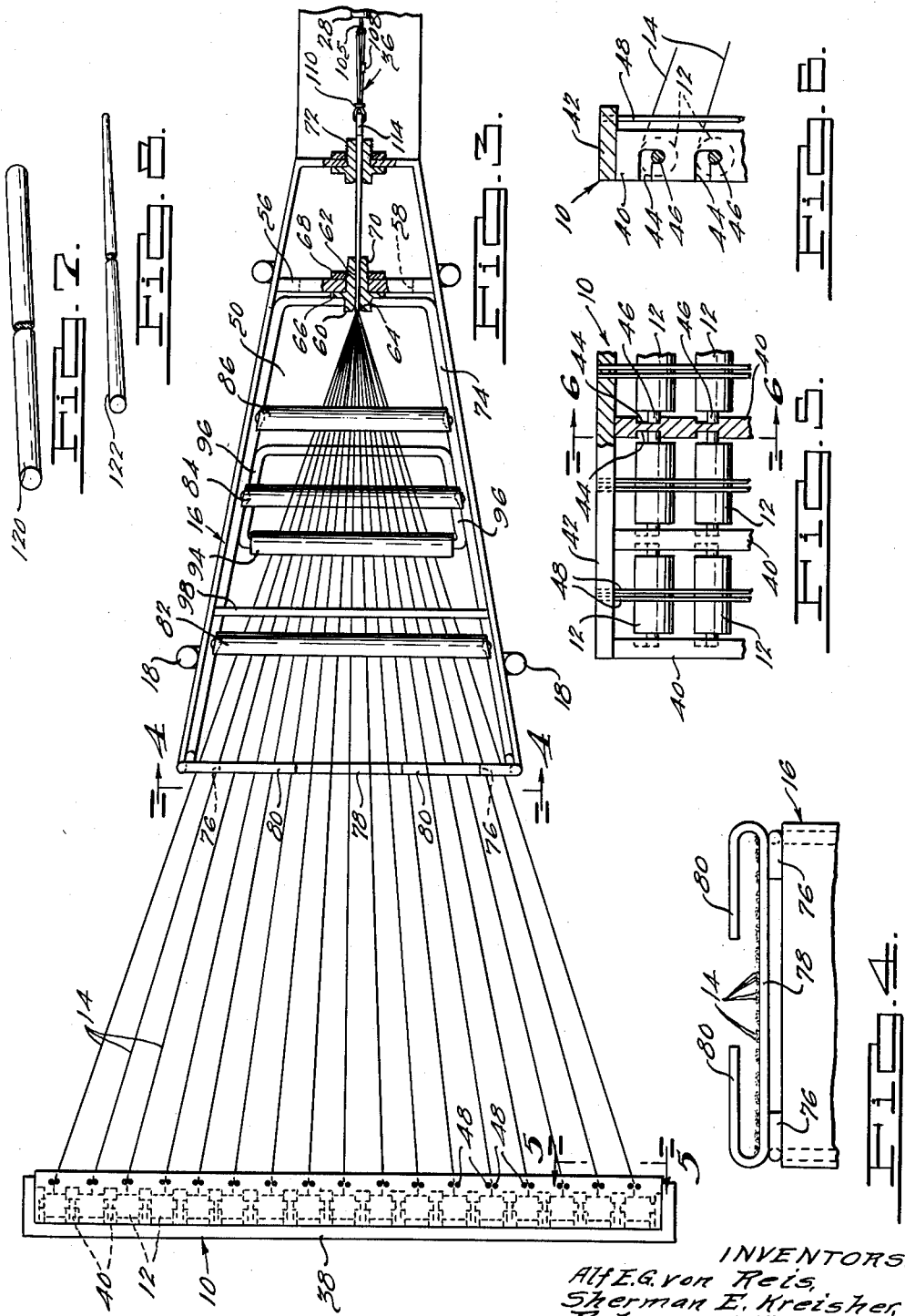

2,721,820
METHOD OF MAKING RODS

Alf E. G. von Reis, Grosse Pointe Farms, Sherman E. Kreisher, Romeo, Peter Quitter, Allenton, and Timothy S. Williamson, Armada, Mich., assignors to Orchard Industries, Inc., Detroit, Mich., a corporation of Michigan Application March 14, 1950, Serial No. 149,544

8 Claims. (Cl. 154—91)

The present invention relates to an improved method of and apparatus for making rods, of the type in which a large number of filaments disposed parallel to the axis of the rod extend throughout its length and are bonded together and the spaces between which are filled by a suitable material.

Previously known methods and apparatus for making rods of this type have been slow, expensive, fraught with numerous difficulties and have resulted in inferior unsatisfactory rods. Such methods and apparatus have employed relatively expensive split molds which were difficult to use, one difficulty being that of getting all of the large number of glass filaments properly disposed during the closing of the mold. Also, the elimination of entrained air or water vapor from rods made by previously known methods and apparatus has been a very serious problem because of the effect of such air both on the physical characteristics and the appearance of the rods.

Rods of the above mentioned type have been made of filaments of glass and using a resin as the binder material but the conventional low pressure laminating methods have resulted in rods in which there is a separation of the resin from the filaments or longitudinal cracking, referred to as delamination.

Accordingly, it is an object of the present invention to provide an improved method and apparatus for making rods of the above mentioned type, which do not have the just mentioned disadvantages.

Another object of the invention is to provide an improved method of laminating such materials which results in rods free of the above mentioned delamination.

It is also an object of the present invention to provide an improved method of and apparatus for making rods by means of which high quality rods of uniform composition and having good strength and flexibility characteristics may be made with a minimum of time, labor and equipment.

It is also an object of the present invention to provide an improved method of and apparatus for making a cylindrical rod in which a very great number of filaments of glass are first coated with a liquid binder material and then drawn into a form in which they are held while the binder material is hardened.

Another object of the present invention is to provide an improved method of and apparatus for making rods of the above mentioned type which are free from air bubbles.

It is also an object of the present invention to provide an improved method of and apparatus for making rods of the above mentioned type by means of which a rod is made from a large number of groups of filaments of glass and the groups of filaments are substantially straight and parallel to the axis of the rod and the groups are not twisted with one another.

Other and more detailed objects of the invention will become apparent from a consideration of the following specification, the appended claims and the accompanying drawings, throughout the several views of which like character references designate like parts and wherein:

Figure 1 is a broken elevational view of a portion of an apparatus embodying the present invention;

Figure 2 is a broken elevational view of another portion of the apparatus partially illustrated in Figure 1;

Figure 3 is a plan view of the structure illustrated in Figure 1;

Figure 4 is a broken sectional view of the structure illustrated in Figure 3, taken along the line 4—4 thereof;

Figure 5 is a broken enlarged view partially in elevation and partially in section of the structure illustrated in Figure 3, taken substantially along the line 5—5 thereof;

Figure 6 is a broken sectional view of the structure illustrated in Figure 5, taken along the line 6—6 thereof;

Figure 7 is a perspective view of a cylindrical rod produced by the method and apparatus of the present invention; and Figure 8 is a perspective view showing a tapered shape which may be given the rod if desired.

It will be appreciated from a complete understanding of the present invention that the improved method and apparatus thereof may be used in connection with the manufacture of rods of various types and sizes adapted for a wide variety of uses. As an illustration of one such use, it has been found that the method and apparatus of the present invention are particularly useful in the manufacture of rods for use as fishing rods, both casting rods and fly rods.

The present invention contemplates the provision of an improved method of manufacturing cylindrical rods of the above mentioned type. This improved method includes the application to a large number of filaments of glass, of a binder material capable of being hardened, the pulling of these filaments of glass into a cylindrical form, and hardening the binder material.

More particularly, this improved method includes the pulling of a great number of filaments of glass into a bath of a suitable material capable of being hardened, removing any air entrained with the filaments of glass, pulling the filaments of glass into a suitable form, and hardening the binder material.

Still more specifically, the applicant's improved method of making a cylindrical rod includes pulling a great number of filaments of glass into a bath of a suitable resin or other material capable of being hardened, with the filaments of glass having a minimum of twist, pulling the filaments of glass in engagement with transversely extending members for removing air entrained with the filaments, pulling the filaments of glass through a preform die, then pulling the filaments into a cylindrical form, and hardening the binder material.

In the preferred embodiment of the applicants' method, the filaments of glass, after being pulled over the transverse members for eliminating air entrained with the filaments of glass, are pulled through a first preform die and thence through a second preform die of slightly larger internal diameter than the first preform die and from the second preform die they are pulled into a cylindrical form of slightly larger diameter than the second preform die. The first preform die restricts the filaments more than the second preform die for the purpose of removing entrained air and the second preform die controls the amount of resin carried to the tubular form by the filaments and is so proportioned relative to the form that the combined cross-sectional area of the filaments and resin is slightly less than the cross-sectional area of the interior of the form.

Also, in the preferred embodiment of the applicants' improved method the binder material employed is any suitable low pressure thermosetting resin such as the polyester resin sold commercially by the Naugatuck Chemical Division of the U. S. Rubber Company under the designation Vibrin 132–Control 127 and the filaments of glass employed are exceedingly fine filaments such as may be purchased in spool form from the Owens-Corning Fiberglas Corporation of Toledo, Ohio, under the designation: "Fiberglas ECG 150–1/0 8 strands, each twisted one turn per inch." Each of these spools has eight strands, each of which in turn consists of 204 separate filaments of glass. The number 150 indicates that 15,000 yards of the Fiberglas on these spools weighs one pound. The particular resin mentioned above may be set by curing it in a suitable oven. This curing may be completed in two hours at 220° F. if a suitable catalyst is added. For example, this result may be obtained by adding a catalyst sold commercially by the Lucidol Division of Novadel-Agene Corporation of Buffalo, New York under the designation "Luperco atc," in the proportion of 240 grams of catalyst per gallon of the above mentioned resin. This catalyst should be thoroughly mixed in, as by mixing in a mixer for 15 to 20 minutes until the liquid clears up (it initially has a milky appearance). The mixture should be allowed to stand until all air bubbles are out of it.

It is an important feature of the applicants' improved method that the cylindrical form is not completely filled by the filaments and bonding materials. Although contrary to the generally accepted theories that such laminates may be best formed under either low pressures or very high pressures, it has been found that by slightly less than completely filling the form with the filaments and resin, in which case it will be appreciated that there is only atmospheric pressure on the materials, an excellent, uniform laminate free of any cracks or separations is obtained. Also, since the tubular form is positioned horizontally, this results in a small passage along the length of the form at its upper side which is important. During the curing of the resin it passes through a stage of very low viscosity during which any moisture in the materials or any remaining entrained air may escape through this small passage. The result is that when the curing is completed, the rod is a greatly improved product free of defects.

While it will be appreciated that the improved method of making cylindrical rods described above may be carried out on a wide variety of apparatuses, the applicants' preferred apparatus for making such rods is illustrated in the accompanying drawings. Referring to these drawings, this apparatus generally comprises a rack 10 for supporting a large number of spools 12, each of which carries the above described 8 strands, each strand consisting of about 204 filaments of glass, all of the filaments of a single spool being represented in the drawings by a single line at 14, a tank 16 supported on a suitable frame 18 in which is carried a bath of liquid resin 20 and a table 22 at the opposite end of the tank 16 from the rack 10, which is provided with spaced supports 24 and 26 adapted to mount a tubular form 28. The table 22 slidably supports a carriage 30 reciprocable in response to the movements of the piston (not shown) of a hydraulic cylinder 32 under the control of a conventional hydraulic valve (not shown). The carriage 30 has an elongated hook rod 34 fixed thereon which is adapted to move through the form 28 and be connected, through a loop 36 to the bundle of filaments 14 which have been pulled through the resin 20 in the tank 16.

Considering the above mentioned elements in greater detail, the rack 10 is supported on a base 38 and is generally rectangular in shape. The rack 10 comprises a frame formed of a plurality of spaced parallel vertically extending bars 40 interconnected at their upper ends by a transversely extending cross-bar 42 and interconnected at their lower ends by the base 38. As best illustrated in Figures 5 and 6, the vertical bars 40 are provided with a plurality of vertically spaced L-shaped slots 44 which are disposed as illustrated in Figures 5 and 6 to receive and rotatably support the opposite ends of the axles 46 extending through the spools 12. As illustrated, the slots 44 open through the left hand side of the rack 10 as viewed in Figures 1 and 6, thereby permitting the spools 12 to be readily inserted and removed from that side of the rack. Intermediate each pair of bars 40, the rack 10 is provided with a pair of closely spaced vertically extending parallel guide rods 48 which are supported at their upper ends in the crossbar 42 and at their lower ends on the base 38. These guide rods 48 serve to guide the filaments of glass 14 as they are drawn from the spools 12.

Referring now to Figures 1 and 3, the tank 16 has a maximum width at its left hand end adjacent the rack 10 and the width progressively decreases to a minimum at the right hand end as viewed in these figures. The tank 16 has an upper chamber 50 in which is received the bath of resin 20 and has a lower chamber 52 sealed therefrom in which is received a bath of light oil and in which is mounted a suitable heating element 54 submerged in the oil. The temperature of the oil is controlled through a thermostatic control generally indicated at 46 and provides a double boiler effect by which the temperature of the resin 20 in the upper chamber 50 is maintained between 75° F. and 85° F. to maintain a sufficiently low viscosity of the resin 20.

The upper chamber 50 has a transversely extending wall 56 disposed in spaced relation to the right hand end thereof which is provided with an aperture 58 well below the surface of the resin 20 to permit ready flow of the resin through the wall 56 but prevent movement of air bubbles along the surface of the resin past the wall 56. The wall 56 also carries a preform die 60 disposed below the surface of the resin 20 and having a cylindrical opening 62 extending therethrough. At the left hand end of the die 60 the cylindrical opening 62 is outwardly flared as indicated at 64 to provide a smoothly curved surface and eliminate fraying of the filaments 14 which might otherwise result as they are drawn into the die 60. The die 60 may be secured to the wall 56 in any suitable manner and in the construction illustrated, the die 60 has an annular outwardly extending flange 66 which abuts the left hand side of the wall 56 and a nut 68 is threaded on an externally threaded portion 70 of the die and engages the right hand surface of the wall 56.

A second preform die 72 disposed in alignment with the die 60, is mounted in the right hand end wall of the tank 16 in a similar manner and differs from the die 60 only in that the internal diameter of the die 72 is slightly greater than that of the die 60.

Intermediate the wall 56 and the left hand end of the tank 16, a frame 74 is mounted in the upper chamber 50. The frame 74 is in the form of a rod extending transversely of the tank 16 adjacent the wall 56 and along the tank 16 at each side thereof to the left hand end of the tank where it extends upwardly and has end portions 76 overlying the upper edge of the left hand wall of the tank 16, as may be clearly seen in Figures 1 and 4. A transversely extending rod 78 is secured as by welding to the end portion 76 of the frame 74 and has reversely turned portions 80 extending in spaced relation above the main portion thereof.

The frame 74 also supports cylindrical bars 82, 84 and 86 which extend transversely of the tank 16 and are connected to vertical supports 88, 90 and 92, respectively, secured as by welding to the frame 74. These transverse members 82, 84 and 86 are disposed below the surface of the resin 20 and are adapted to engage the filaments 14 as they are pulled through the tank 16 for the purpose of releasing air entrained with the filaments 14. Another cylindrical member 94 extends transversely of the tank 16 and is positioned to be supported upon the filaments 14. The member 94 is disposed intermediate the members 82 and 84 and is held against being carried beyond the member 84, by the movement of the filaments 14, by arms 96 secured to the opposite ends thereof and extending downwardly and to the right and engaging the bottom of the upper chamber 50 to the right of the transverse member 84.

The tank 16 is also provided with a transversely extending partial wall 98 which extends above and below the surface of the resin and is disposed intermediate the cylindrical members 82 and 94. This wall 98 serves to prevent air released from the filaments 14 between it and the wall 56 by the cylindrical members 94, 84, 86 and the die 60 from traveling along the surface of the resin 20 in the form of bubbles to the position indicated by the reference character 100 (see Figure 1) where the filaments 14 are drawn into the resin 20.

Referring to Figures 1 and 2, the table 22 carries the support 24 in spaced relation from the die 72 in the right hand end of the tank 16 and the upper surface of the support 24 is V-shaped to position the adjacent end of the form 28 in alignment with the dies 60 and 72. The right hand end of the form 28 fits into a thrust fitting 102 carried on the support 26 to hold the form 28 against axial movement as the filaments of glass are pulled through the form 28 by the hook rod 34, which it will be appreciated, moves from left to right as viewed in these figures, during the pulling of the resin coated filaments of glass into the form 28. The right hand end of the rod 34 is externally threaded and secured to the carriage 30 by a pair of locked nuts 104 which are clamped against opposite sides of the carriage 30. At its opposite or left hand end, the hook rod 34 is provided with a conventional reveresly turned hook portion indicated at 105 for connection to the loop 36. The carriage 30 is secured to the right hand end of a piston rod 106, the other end of which is secured to a piston (not shown) in the cylinder 32. Any suitable source of fluid under pressure (not shown), may be used.

Referring to Figures 1 and 3, the loop 36 of the preferred embodiment there illustrated is formed of piano wire. A double loop is made, as best seen in Figure 1, and the ends are twisted about the wire and soldered as indicated at 108. The loop 36 includes a slip ring 110 encircling the loop and slidable along the loop to vary the effective size of the loop for gripping the bundle of filaments of glass 14. The hook portion 105 of the rod 34 is hooked into the loop 36 at one side of the slip ring 110. The connection for pulling the filaments 14, as above described, is completed by passing the bundle of filaments 14 through the loop 36 at the other side of the slip ring 110, reversely folding the filaments as illustrated and sliding the slip ring 110 toward the filaments to grip the latter.

In the apparatus above described, the filaments from the spools 12 supported in the rack 10 pass between the adjacent pair of guide rods 48 and over the horizontally extending bar 78 at the left hand end of the tank 16 from which they turn downwardly, passing through the resin 20 at the position indicated by the reference character 100 and are pulled around the underside of the cylindrical member 82 and below the floating cylindrical member 94 supported on the filaments 14, from which they are trained over the transverse member 84 and under the transverse member 86. These filaments converge as they move through the tank 16, as is clearly illustrated in Figure 3, and are drawn from the underside of the cylindrical member 86 into the preform die 60 where they are forced into a small bundle. The moving of the filaments 14 in contact with the transverse members 82, 94, 84 and 86, together with the squeezing of the filaments into a small cylindrical bundle by the preform die 60 eliminates substantially all entrained air from the filaments 14. From the preform die 60 the bundle of filaments is drawn through the resin between the wall 56 and the adjacent right hand end of the tank 16 and through the second preform die 72. Although the second preform die 72 is slightly larger than the first die 60, the resin coated filaments 14 so completely fill the die 72 as to prevent leakage of the resin 20 through the die 72, although the latter is disposed below the surface of the resin 20.

Movement of the filaments 14 through the tank 16 and into the form 28 is effected by connecting the loop 36 as shown in the drawings and above described, and operating the valve (not shown) to move the carriage 30 from the position illustrated in full lines in Figure 2, to the position there illustrated in broken lines. To facilitate entry of the doubled end portion, indicated at 114, of the bundle of filaments of glass 14 into the cylindrical form 28, the left hand end portion of the cylindrical bore 116 of the form 28 flares outwardly as indicated at 118 to provide a smooth surface. As the carriage 30 approaches the broken line position illustrated in Figure 2, the hook portion 105 of the hook rod 34 and the doubled portion 114 of the bundle of filaments are pulled through the support 26 to the position illustrated in broken lines in Figure 2. The bundle of filaments is then cut adjacent the support 26 so as to cut off the doubled end portion 114 and the bundle of filaments is also cut at the opposite end of the form 28. This form is then removed and an empty form 28 put in its place and the loop 36 is removed from the hook 105 and the latter is moved back through the empty form 28 to the position illustrated in full lines in the drawings. After the cut off end portion 114 is removed from the loop 36, the hook 105 is again connected to the loop 36 at one side of the slip ring 110 and again the end portion of the bundle of filaments projecting from the die 72 is passed through the loop 36 at the other side of the slip ring 110 which is as illustrated in the drawings, then moved to the position illustrated in Figure 1 and described above.

The number of filaments 14 employed depends, of course, upon the internal diameter of the form 28, as do also the internal diameters of the preform dies 60 and 72. The number of filaments 14, however, is preferably as high as may be used while permitting the doubled end portion 114 of the filaments, from which virtually all of the resin has been squeezed, to be pulled through the form 28 without excessive damage to the outer filaments. This pulling of the doubled end 114 through the form 28 necessitates the transmission of a considerable load through the loop 36. It is for this reason that a double loop is used, as described above. It will be appreciated that as the diameter of the wire of the loop 36 is increased, the number of filaments which it may pull through a given form 28 is accordingly decreased and for this reason it is important to keep the loop wire of as small a diameter as is consistent with carrying the required load.

As an example of a particular embodiment of the apparatus of the present invention, it has been found that for a form 28 having an internal diameter of .360", very satisfactory results are obtained with a preform die 72 having an internal diameter of .349" and a preform die 60 having an internal diameter of .3415". With the particular resin 20 mentioned above, and with the particular above mentioned spools 12, it has been found that the best results are obtained when 190 to 205 spools 12 are used. It will be appreciated from the above description of the number of strands per spool and the number of individual filaments per strand, that the resulting rod has over three hundred thousand (300,000) filaments. In a specific instance in which 193 of these spools 12 were used, it was found that the weight of glass in the hardened rod was slightly less than the weight of the resin in the rod, the weight of the glass filaments going into the rod being 85 grams and the total weight of the rod being 176 grams. It will be appreciated that with spools having more or less ends per spool and more or less individual filaments per end, or with a different resin, it would be necessary to vary the number of spools 12 accordingly. In the specific example given above, the loop 36 was made of wire having a diameter of .020" and the over-all diameter of the slip ring 110 was .200".

The cylindrical rods 120, see Figure 7, are readily removed from the forms 28 after completion of the curing of the resin by sawing off the end portion of the rod projecting from the right hand end of the form 28, as viewed in the drawings, and striking the right hand end of the rod. This normally breaks it loose from the form and permits it to be readily withdrawn from the left hand end of the form. If necessary, it may be driven all the way out. In the particular illustration given above, the cylindrical rod, upon removal from the form 28, was found to have an average diameter of approximately .347". The term average diameter is used for the reason that the form 28 is not quite filled by the resin coated filaments of glass and the surface of the rod is somewhat irregular. It has been found that from this cylindrical rod a tapered rod, such for example as the rod 122 illustrated in Figure 8, having a diameter up to .284" may be ground. As mentioned above, such tapered rods have been found particularly useful in fishing rods of various types.

It is an important feature of the applicant's improved method and apparatus that all of the air entrained by the filaments is removed. Air bubbles in the finished rod cause serious weaknesses from a structural point of view which are readily apparent and also mar the uniform appearance of the rod. When the particular resin and filaments of glass above described are used, the rod has the appearance of being formed of a single material and the filaments of glass are not visible as such and the presence of air bubbles would be especially damaging to the appearance of such rods.

It is also an important feature of the present improved method and apparatus that the filaments of glass 14 have a minimum of twist in the form 28 and accordingly, in the finished rod. As stated above, the strands of each spool are twisted one turn per inch which, in view of the very small size of the strands, is almost negligible. It might be that with strands with less or no turns would be better for the present purposes, but they are not commercially available. By pulling the filaments from each spool tangentially, as in the apparatus illustrated and described, further twisting of the strands is avoided.

Another important feature of the above described method and apparatus is that the relatively expensive split molds of previously known methods and apparatus are replaced by the very inexpensive forms 28. Also, the present method greatly simplifies the placing of the material in the forms, thereby greatly increasing production and affording large savings in labor.

While only one specific embodiment of the invention has been illustrated and described in detail, it will be readily appreciated by those skilled in the art that numerous modifications and changes may be made without departing from the spirit of the invention.

What is claimed is:

1. A method of making a rod comprising pulling a large number of fine flexible filaments of glass into a bath of a liquid material capable of being hardened, pulling said filaments of glass through a first preform die submerged in said material, pulling said filaments of glass from said bath of material through a second preform die and into a stationary and rigid cylindrical form, said second preform die sizing said bundle for movement into said form and having a greater cross-sectional area than said first preform die, and hardening said material.

2. A method of making a rod comprising simultaneously pulling a large number of fine flexible filaments of glass through a bath of a low pressure thermosetting resin, simultaneously pulling all the filaments into a cylindrical form, restricting the bundle of filaments while immersed in the bath to a diameter less than the internal diameter of the form, allowing the bundle of filaments to expand beyond the point of said restriction, and again restricting the bundle of filaments, also ahead of the form, to a diameter greater than the diameter at the first restriction and slightly less than the internal diameter of the form, and setting said resin while it is in said form.

3. The method of forming a rod, comprising drawing a plurality of strands of glass filaments into a liquid bath of a hardenable resin, forming said strands into a bundle while submerged in said resin, withdrawing said bundle from said bath through a die disposed below the liquid level of said bath, and drawing said bundle into a rigid tubular form aligned with said die, and hardening the resinous material while the bundle is within the form.

4. The method of forming a rod comprising drawing a plurality of strands of glass filaments into a liquid bath of a hardenable resin, forming said strands into a bundle while submerged by pulling the strands through a submerged bundling die, sizing said bundle for movement into a form by pulling said bundle from said bath through a sizing die aligned with said bundling die having its entrance end submerged in said bath and its exit end disposed externally of said bath, pulling said bundle from said sizing die and into a stationary rigid form aligned with said dies and in which the bundle is held in the desired cross-sectional shape during hardening of the resin, and hardening the resin.

5. The method of forming a rod comprising pulling a plurality of strands of glass filaments into a liquid bath of a hardenable resin, gathering said strands into a bundle while submerged in said bath by pulling said strands through a bundling die submerged in said bath, and, while maintaining the bundle in straight form, pulling the bundle from the bundling die and into an elongated form, and hardening the resin of said bundle while it is in said form.

6. The method of forming a rod comprising pulling a plurality of strands of glass filaments into a liquid bath of a hardenable resin, pulling said strands through a portion of said bath and into a bundling die to gather said strands into a bundle while submerged in said bath, pulling said bundle from the bundling die and maintaining said bundle straight while subsequently pulling said bundle through a second portion of said bath and thence axially relative to and into an elongated form, and hardening the resin of said bundle while it is in said form.

7. A method as defined in claim 6 wherein while maintaining said bundle straight, said bundle is properly sized for pulling into said form by pulling said bundle from said bath through a sizing die.

8. The method of forming a rod comprising coating a plurality of glass filaments by moving said filaments through a bath of hardenable resin, subsequently moving said filaments into an elongated form, and hardening the resin while it is in said form, and wherein said strands are gathered into a bundle while submerged in said bath by restricting the strands to a predetermined area and said bundle is subsequently permitted to expand while submerged in said bath and pick up additional resin material and then is properly sized for movement into said form by again restricting said bundle to an area slightly greater than said predetermined area and slightly less than the cross-sectional area of said form, and wherein said bundle is maintained in straight form from the time that it is formed until the resin thereof has been hardened.

References Cited in the file of this patent

UNITED STATES PATENTS

| | | |
|---|---|---|
| 461,245 | Maulden | Oct. 13, 1891 |
| 1,421,306 | Rawlings | June 27, 1922 |
| 1,520,342 | Grabau | Dec. 23, 1924 |
| 2,055,776 | Saladino | Sept. 29, 1936 |
| 2,210,432 | Roesch | Aug. 6, 1940 |
| 2,419,328 | Watson | Apr. 22, 1947 |
| 2,422,234 | Goldman | June 17, 1947 |
| 2,558,855 | Knewstubb et al. | July 3, 1951 |

FOREIGN PATENTS

| | | |
|---|---|---|
| 892,116 | France | Jan. 3, 1944 |
| 627,255 | Great Britain | Aug. 4, 1949 |

OTHER REFERENCES

Howald, Modern Plastics, Feburary 1946, pages 124 and 125.